(12) United States Patent
Dixon et al.

(10) Patent No.: US 7,119,145 B2
(45) Date of Patent: Oct. 10, 2006

(54) SURFACE GRAFT MODIFIED RESINS AND FORMATION THEREOF

(75) Inventors: Arthur R. Dixon, Playa Del Ray, CA (US); Emmet E. Welch, Aliso Viejo, CA (US); Shahana Huq, Cerritos, CA (US)

(73) Assignee: Phenomenex, Inc., Torrance, CA (US)

( * ) Notice: Subject to any disclaimer, the term of this patent is extended or adjusted under 35 U.S.C. 154(b) by 0 days.

(21) Appl. No.: 10/351,119

(22) Filed: Jan. 24, 2003

(65) Prior Publication Data

US 2003/0144421 A1    Jul. 31, 2003

Related U.S. Application Data

(60) Provisional application No. 60/351,695, filed on Jan. 25, 2002.

(51) Int. Cl.
C08F 112/36 (2006.01)
C08F 126/10 (2006.01)
C08L 51/06 (2006.01)

(52) U.S. Cl. .................. 525/64; 525/69; 525/84; 525/105; 525/119; 525/148; 525/326.9; 525/332.2

(58) Field of Classification Search .......... 525/64, 525/69, 326.9, 84, 105, 106, 119, 148, 332.2
See application file for complete search history.

(56) References Cited

U.S. PATENT DOCUMENTS

| | | | |
|---|---|---|---|
| 3,822,530 A | 7/1974 | Fuller et al. | |
| 3,878,310 A | 4/1975 | Field et al. | |
| 3,954,682 A | 5/1976 | Fein et al. | |
| 4,184,020 A | 1/1980 | Lim et al. | |
| 4,196,175 A | 4/1980 | Jensen | |
| 4,297,220 A | 10/1981 | Meitzner et al. | |
| 4,303,531 A | 12/1981 | Kawabata et al. | |
| 4,382,124 A | 5/1983 | Meitzner et al. | |
| 4,859,736 A | 8/1989 | Rink | |
| 5,037,656 A * | 8/1991 | Pitt et al. | 424/443 |
| 5,071,565 A | 12/1991 | Fritz et al. | |
| 5,230,806 A | 7/1993 | Fritz et al. | |
| 5,274,028 A * | 12/1993 | Bertrand et al. | 525/17 |
| 5,278,339 A | 1/1994 | Cook | |
| 5,683,800 A * | 11/1997 | Stringfield et al. | 428/318.4 |
| 5,876,367 A | 3/1999 | Kaganov et al. | |
| 5,882,521 A | 3/1999 | Bouvier et al. | |
| 5,976,367 A | 11/1999 | Bouvier et al. | |
| 6,106,721 A | 8/2000 | Bouvier et al. | |
| 6,254,780 B1 | 7/2001 | Bouvier et al. | |
| 6,358,557 B1 * | 3/2002 | Wang et al. | 427/2.24 |

FOREIGN PATENT DOCUMENTS

| | | |
|---|---|---|
| DE | 4204573 | 8/1993 |
| EP | 0021817 | 10/1985 |
| GB | 1268875 | 3/1972 |
| JP | 2080472 | 3/1990 |
| WO | WO97/38774 | 10/1997 |

* cited by examiner

Primary Examiner—James J. Seidleck
Assistant Examiner—Olga Asinovsky
(74) Attorney, Agent, or Firm—Stetina Brunda Garred & Brucker

(57) ABSTRACT

Pre-formed polymer particles are chemically modified by free radical-initiated surface graft modification. The resulting resin is specifically adapted to provide enhanced chromatographic performance throughout chromatographic separations.

33 Claims, 2 Drawing Sheets

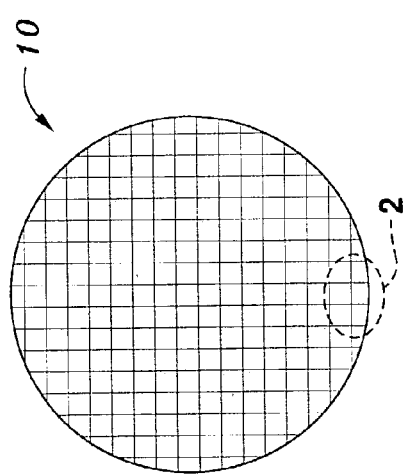
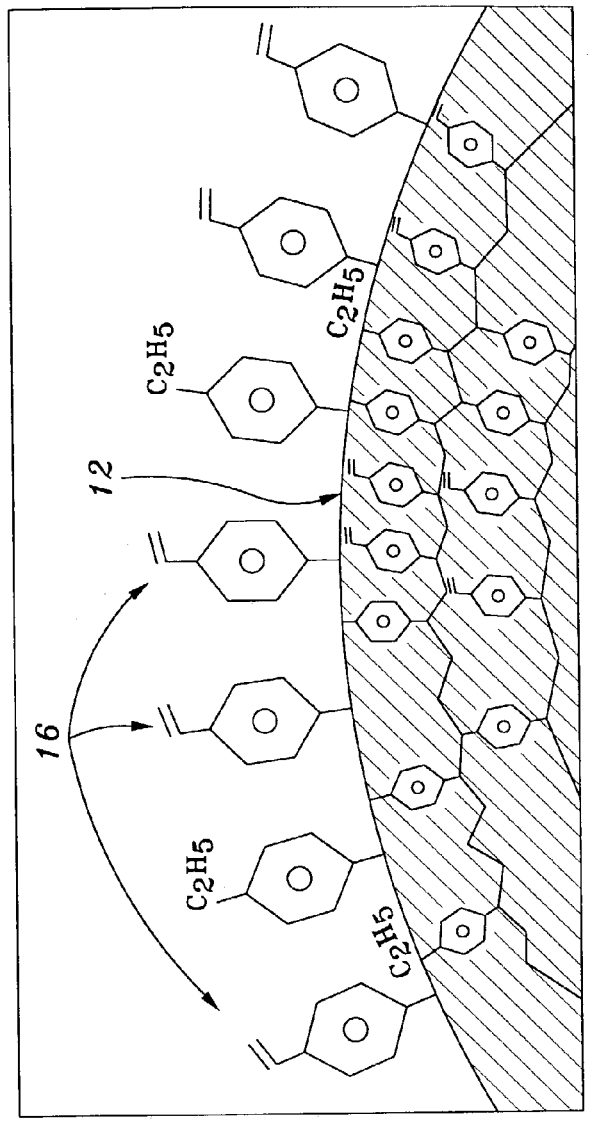
FIG. 1
FIG. 2

SURFACE GRAFT MODIFIED RESINS AND FORMATION THEREOF

CROSS-REFERENCE TO RELATED APPLICATION

This application claims the benefit of U.S. Provisional Application No. 60/351,695 filed Jan. 25, 2002, the entire content of which is hereby incorporated by reference.

BACKGROUND OF THE INVENTION

The present invention relates generally to resins for use in chromatography, and more particularly to an improved surface graft modified resin that is specifically adapted to provide enhanced chromatographic performance throughout chromatographic applications.

The use of chromatography in pharmaceutical, biotechnology and environmental research industries is well known. Chromatography is a vital process in these industries as it is applied upon many aspects of their business. For example, chromatography can be used to prepare and analyze drug samples, purify various essential chemicals, and has large-scale applications such as cleansing aqueous solutions of any toxic materials.

Traditionally, the most widely utilized resins have been silica-based. Because silica resins have been so widely employed, methods and chemicals for their modification are well documented in the art and commercially available. In recent years, however, polymer-based resins have gained popularity due to advantageous chromatographic properties over silica-based resins such as high surface area and pH stability.

Most polymer-based resins are formed through co-polymerization of two or more monomers. A monomer is a substance of which each of its molecules can contribute one or more constitutional units in the structure of a macromolecule. In this context, co-polymerization is a chemical reaction that links two or more different monomers together to form a co-polymer.

In these resins, monomers of various desired properties are co-polymerized in the presence of an initiator and a porogenic solvent to start a chain reaction. Depending on a number of factors (e.g., ratio of the monomers used, initiator, porogenic solvent, temperature and the like), the resulting resins will have varying physical structures or morphology, as well as varying chemical properties. Exemplary types of these resins are (poly)styrene-divinylbenzene and (poly)methacrylates. Unfortunately, most of the "off-the-shelf" variants of these resins have a limited range of chemical properties, thus limiting the number of chromatographic applications for which they may be applied.

One approach to alleviating this deficiency is to alter the monomers used during co-polymerization to produce resins with unique chromatographic characteristics. However, such approach is disadvantageous as by altering the co-polymerization conditions (e.g., monomers, temperature, initiators, etc.), the physical structure of the resulting resin may be undesirably changed in a way that is no longer ideal for the intended chromatographic application. As such, forming resins with proper physical and chemical qualities in the above-noted manner can require extensive and grueling research.

Some resins are also produced by using Merryfield Resins and Friedal Crafts reactions. These techniques chemically modify the existing resins at their surfaces. However, Merryfield resins are often undesirable as they require a two-step reaction in order to achieve the suitable derivitized surface, and is thus time-consuming. Moreover, Freidal Crafts reactions require the use of metal catalysts which in many chromatographic techniques can cause unwanted adsorption of metal-chelating compounds. In addition, Freidal Crafts reactions further require strict control over reaction conditions, making consistent reproductions of resins a challenge.

In view of the above-described shortcomings of prior art resins, there exists a need in the art for an improved chemically-modified resin which achieves desired chromatographic properties through a one-step reaction without altering the ideal physical/chemical characteristics thereof. Moreover, there exists a need for an improved chemically-modified resin that can be readily manufactured in a time-efficient manner, while being reproducible on a consistent basis.

BRIEF SUMMARY

The present invention specifically addresses and alleviates the above-referenced deficiencies associated with the use of prior art resins. More particularly, a polymer particle is selected to have desired physical characteristics. A monomer is selected that has a desired chromatographic property and the polymer is then chemically modified at its surface by a solution-based, free radical-initiated surface graft modification to attach the monomer to the polymer particle to produce the desired resin. This specific resin is specifically adapted to provide enhanced chromatographic performance throughout chromatographic separations. The resin may be used in the form of a porous/non-porous bead, pellet, membrane or monolithic support/structure, ranging from 10% to 100% cross-linked. Preferably, this range is 45% to 100%, and even more preferably, 70% to 100%. The polymer particle is selected for various physical characteristics that the user believes are desirable, including one or more of the polymer material, polymer size, polymer shape, surface area, pore density, pore size, pore shape, pore volume, and any other physical or material property that is now known or in the future becomes known as affecting the chromatographic performance of the resins or the overall longevity and performance of the resin as used in chromatographic applications.

In accordance with a preferred embodiment, the resin may be formed by first obtaining a polymer particle such as (poly)styrene-divinylbenzene or cross-linked (poly)methacrylate. Preferably, the polymer particle is purchased "off-the-shelf" in order to save time and facilitate the overall manufacturing process. However, one of ordinary skill in the art would understand that the polymer particle used for the resin may be formed from scratch.

In the preferred embodiment, the obtained polymer particle is placed into a liquid medium. The polymer particle is then surface graft modified at its surface by a chemical modifier. The chemical modifier may be any alkene chemical reagent such as N-vinylpyrrolidone, acrylamide, N,N-dimethylacrylamide, or maleic anhydride. After undergoing surface graft modification, the resin is capable of displaying desired chromatographic performance.

The process of surface graft modification is greatly advantageous over the previously described methods (e.g., co-polymerization, Friedal Crafts reaction, Merryfield resins) because it provides a simple and effective means for chemically modifying a resin. Surface graft modification typically operates to chromatographically enhance an existing polymer particle without significantly impacting the specific physical morphology and/or chemical characteristic thereof.

More particularly, a readily available polymer particle with specific physical characteristics/morphology (e.g., pore size, surface area, pore volume) can be selected, in which a desired chemical modifier may be surface graft modified to its surface. This method requires far less time and research in creating an optimal chromatographic resin while avoiding the disadvantages associated with the above-described prior art methods.

Depending on the specific chemical modifier used, the resin may be applied in many chromatographic techniques. These techniques include, but are not limited to, Solid Phase Extraction (SPE), Flash Chromatography, Liquid Chromatography (LC), and various forms of Liquid Chromatography including Reversed Phase Chromatography, Normal Phase Chromatography, Gel Filtration Chromatography, Ion-Exchange Chromatography, and Affinity Chromatography.

BRIEF DESCRIPTION OF THE DRAWINGS

These as well as other features of the present invention will become more apparent upon reference to the drawings wherein:

FIG. 1 is an exemplary illustration of an "off-the-shelf" polymer particle which is portrayed in the form of a porous bead;

FIG. 2 is a partial cross-sectional view of the polymer particle shown in FIG. 1, illustrating the un-reacted alkene groups exposed on its surface;

DETAILED DESCRIPTION

Figure 4:
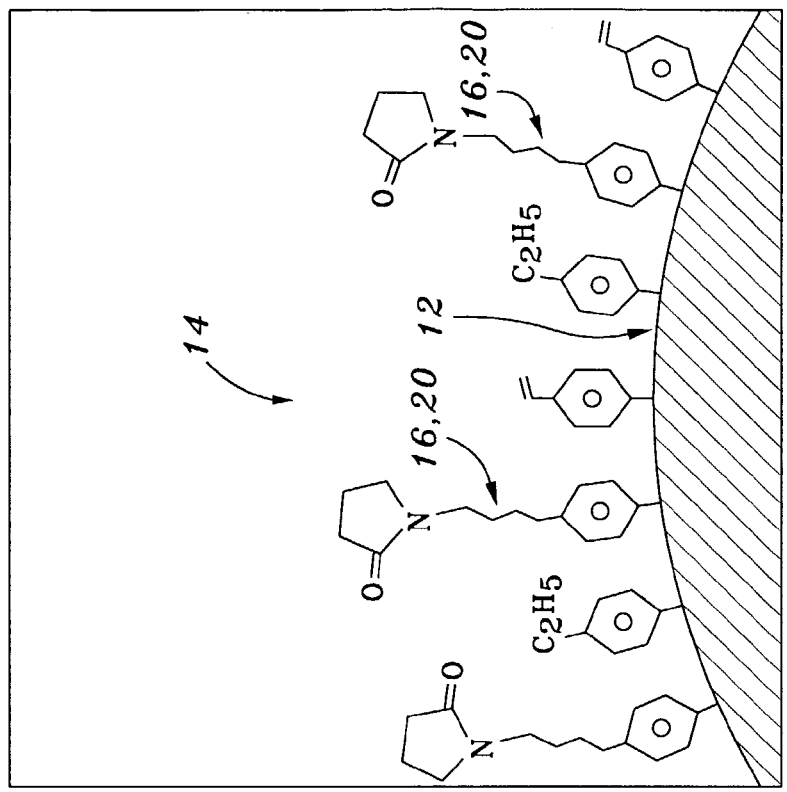
FIG. 4 is a partial cross-sectional view of the polymer particle shown in FIG. 3, conceptually illustrating the covalent bondage between the chemical modifiers and the exposed alkene groups after undergoing surface graft modification.

Referring now to the drawings, which showings are for purposes of illustrating preferred embodiments only, and not for purposes of limiting the same, FIG. 1 illustrates a polymer particle 10 which may be chemically modified at its surface 12 through free radical-initiated surface graft modification in a solution. By undergoing the process of surface graft modification, the polymer particle 10 having a surface 12 may transition into an optimal chromatographic resin 14 as selected by the user (as conceptually illustrated in FIG. 4).

Referring more particularly to FIGS. 1, 2 and 4, the resin 14 is chromatographically enhanced so that it may display enhanced chromatographic performance throughout chromatographic separations. The term chromatographically enhanced, as used herein, refers to a chemical modification of a polymer particle 10 to alter and enhance its original chromatographic properties. For instance, chromatographic enhancement may allow a generally non-polar or hydrophobic (water-hating) (poly)styrene-divinylbenzene polymer particle 10 to become more polar or hydrophilic (water loving). This improves the resin's chromatographic retention of polar solutes in a chromatographic system, and improve the resin's ability to remain "wetted" during chromatographic extractions. Chromatographic enhancement may also allow modification of the polymer particle's surface 12 from a neutral (non-charged) state to a cationic (positively charged) state so as to improve chromatographic retention in an anionic exchange chromatography system.

Advantageously, but optionally, the particle 10 comprises either a (poly)styrene-divinylbenzene or cross-linked (poly) acrylate or (poly)methacrylate material. Further, the polymer particle 10 can be any porous/non-porous polymer bead, membrane or monolithic support/structure ranging from 10% to 100% cross-linking. Preferably, this range is 45% to 100%, and even more preferably, 70% to 100%. The polymer particle 10 may be, for example, in the form of porous or non-porous beads ranging from 1 to about 500 μm in diameter, and preferably from 1 to 300 μm in diameter. The polymer particle 10 can also be, for example, in the form of a porous or non-porous flat membrane, or a solid, porous monolithic rod or cylinder support. Membrane polymers advantageously have a thickness of 0.1 mm to 50 mm, and preferably have a thickness of 0.25 mm to 2 mm. Monolithic particles advantageously have a cylindrical configuration. Diverse geometric shapes can be used. Whatever form it takes, the polymer particle 10 preferably has a surface area ranging from about 1 to 1200 square meters per gram. Moreover, the preferred polymer particle 10 ranges from non-porous particles to particles with median pore sizes of about 10 angstroms to about 5000 angstroms, and preferably with pore sizes of about 50 angstroms to about 4000 angstroms.

Preferred types of polymer particles 10 include, but are not limited to, (poly)styrene-divinylbenzene and (poly)ethylbenzene-divinylbenzene. Other useable types include, but are not limited to, polystyrenes such as (poly)styrene-ethylene glycol dimethacryate, and (poly)styrene-ethylene glycol diacrylate. It may alternatively include, but are not limited to, polyethylbenzenes such as (poly)ethylbenzene-ethylene glycol dimethacryate and (poly)ethylbenzene-ethylene glycol diacrylate. Other useable types of polymer particles 10 may further alternatively include, but are not limited to, polymethacrylates such as (poly)methyl methacrylate-divinylbenzene, (poly)methyl methacrylate-ethylene glycol dimethacrylate, (poly)methyl methacrylate-ethylene glycol diacrylate, (poly)butyl methacrylate-ethylene glycol dimethacryate, (poly)butyl methacrylate-ethylene glycol diacrylate, and (poly)butyl methacrylate-divinylbenzene. Likewise, it may include, but are not limited to, polyacrolates such as (poly) acrylonitrile-divinylbenzene, (poly)acrylonitrile-ethylene glycol dimethacryate, (poly) acrylonitrile-ethylene glycol diacrylate, (poly)acrylamide-ethylene glycol dimethacryate, (poly)acrylamide-ethylene glycol diacrylate, and (poly)acrylamide-divinylbenzene.

These polymer particles 10 are available from many different sources such as Mitsubishi Chemical Corporation of Tokyo, Japan, for example, and thus specific descriptions are not given herein. The time and expenses needed to create polymer particles 10 of a specific size and surface area can be avoided by purchasing an existing polymer particle 10 with the desired specifications such as pore size, surface area, or pore volume. Alternatively, however, a person of ordinary skill in the art will contemplate that the polymer particle 10 may be manufactured from scratch as opposed to buying it "off-the-shelf."

The surfaces 12 of the cross-linked polymer particles 10 have free, un-reacted alkene groups 16. The cross-linking monomers used in the formation of cross-linked polymer particles 10 contain at least two alkene groups 16, allowing the monomers to covalently bind two or more separate polymer chains. For clarification, cross-linking generally means permanently linking the polymer chains together. An alkene is a molecule which contains one or more unsaturated carbon-carbon double bonds. During formation of cross-linked polymer particles 10, some of the alkene groups 16 on the cross-linking monomer do not undergo a reaction with a polymer chain and will remain "free." These un-reacted alkene groups 16 are most likely present throughout the polymer particle 10, but of particular interest, are present on the surface 12 of the polymer particle 10 (throughout applicable surface).

As will be discussed below, these alkene groups 16 have a stationary, outward-facing orientation on the surface 12 of the polymer particle 10 and are desirable points of attachment for chemical modifiers 18 via free-radical initiated surface graft modification. Advantageously, there are from about 0.01µ mole per square meter to about 8µ mole per square meter of un-reacted alkene groups on the surface of the particle.

Before undergoing surface graft modification, the presence and concentration of un-reacted alkene groups 16 may be measured by reacting polymer particles 10 with a monomer or chemical reagent that contains an element not found in the original polymer. Sulfur is useful because it reacts one-to-one. Sulfur can be provided from a reagent such as 2-mercaptoethanol. The sulfur in this reagent will react one-to-one with free surface alkene groups 16. After the reaction, the sulfur content may then be measured by elemental analysis which provides a concentration of reacted 2-mercaptoethanol. Hence, the number of surface alkene groups 16 can be found. It should be noted that the process just described in this paragraph is optional, and may be omitted if chosen to do so.

After surface graft modification, the resulting resin 14 can be optionally analyzed to determine the amount of that selected element that is on the resin in order to evaluate the extent of the grafting. More specifically, the above-described detection process may be repeated to observe the number of free surface alkene groups 16 which did not undergo the surface graft modification. By comparing the number of free alkene groups 16 before and after the surface graft modification process, the extent of grafting may be evaluated. The addition of an element and later detection of that element in order to evaluate the amount of surface graft modification, is optional, and may be omitted if chosen to do so.

Experimentation #1—Concentration of Alkene Groups:

1.3 g of a 500 $m^2/g$, porous (poly)styrene-divinylbenze (50% divinylbenzene) polymer particle was placed in 10 ml of methanol and 1.5 ml of 2-mercaptoethanol was added. This solution was kept at room temperature for 24 hours, then thoroughly washed with methanol to remove any un-reacted 2-mercaptoethanol. Elemental analysis gave 2.3% sulfur, which correlates to an available surface concentration of alkene groups of approximately 1.5 umol/$m^2$. This indicates that an effective coating could be grafted to the surface.

Due to the presence of un-reacted surface alkene groups 16, the surface 12 of the polymer particle 10 can be chemically modified through free-radical initiated surface graft modification. Free radical-initiated surface graft modification is a process that allows the attachment of a chemical modifier 18 containing its own free alkene group 20 to a free alkene group 16 on the surface 12 of the polymer particle 10. This attachment between the two respective alkene groups 16, 20 is made through the creation of a covalent bond. Simply put, surface graft modification provides a simple and effective means for chemically modifying a pre-existing polymer particle 10. As described herein, this surface graft modification preferably occurs in solution, not in a melt. Although it may occur in a melt, the physical properties of the particles 10 resulting from solution are believed different than obtained from a surface graft modification occurring in a melt, and are believed much more desirable than what occurs in a melt.

Figure 3:
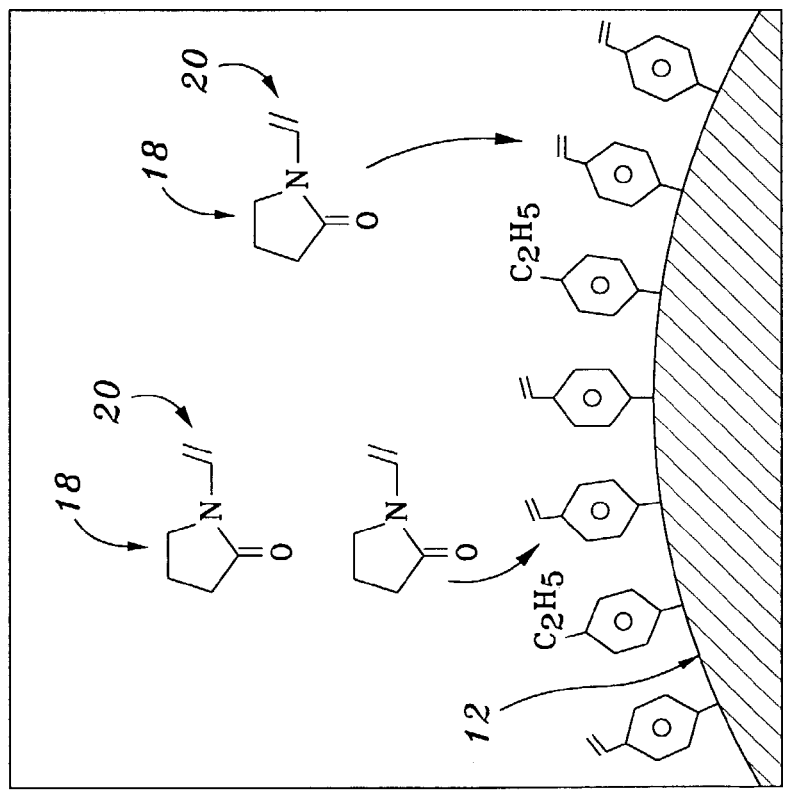
FIG. 3 is a partial cross-sectional view of the polymer particle shown in FIG. 2, conceptually illustrating the chemical modifiers disposed about the exposed alkene groups prior to undergoing surface graft modification.

Referring now to FIGS. 3 and 4, the polymer particle 10 is placed within a liquid medium or solvent (not shown). The medium or solvent is selected to be non reactive with the particles 10, and thus contain no alkene groups. The medium or solvent must also dissolve the monomers or reagents that provide the chromatographic properties. As used herein the term soluble advantageously means that about 60% or more of the modifier 18 by weight can be dissolved in the solvent, and preferably over 95% can be dissolved, and ideally all of the modifier 18 can be dissolved in the selected solvent at the reaction temperature at which surface graft modification is performed.

The solvent could also be selected to have a boiling point that can be used to increase the speed of the surface graft modification reaction, but temperature controllers could be used for reactions that occur below the boiling point of the solvent. If a reaction occurs at the boiling point of the solvent, a reflux reaction may advantageously be used to recycle and conserve the solvent. Exemplary liquid solvents or mediums include methanol, 1,4-dioxane, or tetrahydrofuran. A variety of other solvents could be used.

Chemical modifiers 18 are added into the liquid medium after the polymer particle 10 has been placed therein. The chemical modifiers 18 are selected to have a free alkene group. The modifiers 18 are typically monomers containing only one type of free alkene group. It is believed possible to use modifiers that contain a very few different alkene groups but those different groups will cross link and increase the surface graft modification beyond the desired amount which may lead to clogged pores.

The chemical modifiers 18 provide a point for attaching to the free alkene group on the surface of the particle 10. The chemical modifiers are selected to provide chromatographic properties to the particle 10. The chemical modifiers are selected for their ability to attract the molecule or molecules to be analyzed by chromatographic means, and to hold the selected molecule or molecules to the surface of the particle for a desired length of time sufficient to allow chromatographic separation.

The chemical modifier 18 may be any alkene chemical reagents. Styrenes, acrolates, and methacrolates are preferred classes of modifiers 18. Although N-vinylpyrrolidone (alternative spelling is N-vinylpyrrolidinone) is preferred, other alkene chemical reagents may be used. They include acrylamide, N,N-dimethylacrylamide, maleic anhydride, 2-hydroxyethyl methacrylate, ethylene glycol phenyl ether methacrylate, glycidyl methacrylate, methyl methacrylate, butyl acrylate, tert-butyl acrylate, octyl acrylate, phenyl methacrylate, N,N-dimethylacrylamide, N-butylacrylamide, N-vinylacrylamide, N,N-methylvinylacrylamide, acrylonitrile, or combinations thereof.

Simultaneously therewith or shortly after the chemical modifier 18 is added, free radical initiators are also added into the liquid medium or solvent in order to stimulate free-radical reaction resulting in resin 16. 2,2'-azobisisobutyronitrile (AIBN) is the preferred free radical initiator. However, other types such as hydrogen peroxide, benzoyl peroxide, or di-tertiarybutyl peroxide may be used as well. As mentioned above, free-radical reaction is a type of reaction that allows two alkene groups to bond together, the resulting bond between them being a single carbon-carbon covalent bond. It should be noted that the specific order of introduction of the chemical modifier 18, free radical initiators, and particles 10 into the liquid medium need not be closely followed. It is enough that the constituents are merely present because surface graft modification does not commence until the liquid medium is heated at controlled intensity. The temperature used can be set by a temperature controller on which the solvent is set, or the boiling point of the solvent can be used.

In a first embodiment, a (poly)styrene-divinylbenze (PS-DVB) particle was subjected to free-radical initiated surface graft modification with N-vinylpyrrolidone chemical modifiers. The resulting resin 16 exhibits chemical properties that allow it to be easily "water-wettable." The chemical properties of this resin allow the surface to maintain its conditioned character even after it has been visibly run dry by vacuum.

Experimentation #2—N-vinylpyrrolidone Surface Graft Modification:

50 g of a 30 micron, 800 $m^2$/g surface area and 1 ml/g pore volume PSDVB polymer sorbent made from 80% divinylbenzene and 20% ethylstyrene was added to 300 ml of 1,4-dioxane. To this solution was added 25 ml of the modifying alkene reagent N-vinylpyrrolidone and 0.5 g of the free radical initiator 2,2'-azobisisobutyronitrile (AIBN). This solution was heated to a boiling condition (about 100 C.) for 3 hours, and washed with 1,4-dioxane to remove any un-reacted monomers or polymers formed in solution. This modified surface on resin 14 contained nitrogen, which was measured as 1.3% by weight of the surface graft modified polymer particle. This corresponds to a level of grafting of 1.2 micromoles of surface grafted monomer per meter squared (u mol/$m^2$) on the surface of the polymer particle 14.

Experimentation #3—N-vinylpyrrolidone Surface Graft Modification:

50 g of a 30 micron, 800 $m^2$/g surface area and 1 ml/g pore volume PSDVB polymer sorbent made from 80% divinylbenzene and 20% ethylstyrene was added to 300 ml of 1,4-dioxane. To this solution was added 8.4 ml of the modifying alkene reagent N-vinylpyrrolidone and 0.5 g of the free radical initiator 2,2'-azobisisobutyronitrile. This was heated to a boiling condition (about 100 C.) for 3 hours, and washed with 1,4-dioxane to remove any un-reacted monomers or polymers formed in solution. This modified surface on resin 14 contained nitrogen, which was measured as 1.1% by weight of the surface graft modified polymer particle. This corresponds to a level of grafting of 1.0 micromoles of surface grafted monomer per meter squared (u mol/$m^2$) on the surface of the polymer particle.

Each surface graft modified resin 14 resulting from the above experimentations was then packed into a suitable housing such as a standard cartridge, column, cylinder or the like. The ability of these resins 14 to retain polar organic solutes after being pre-wetted and then dried was compared to that of traditional non-surface graft modified (poly) styrene-divinylbenzene resin and silica based C18 resin. After only a few minutes of being run dry, the ability of non-surface graft modified (poly)styrene-divinylbenzene resin and silica based C18 resin to extract polar organic solutes was dramatically reduced. The surface graft modified resin, on the other hand, maintained over 90% of its extraction ability, even after 10 minutes of drying under vacuum, a condition which significantly reduced extraction abilities of the above-described prior art resins.

In a second embodiment, it is noted that nitrile-modified chromatographic resins are useful for providing alternative chromatographic selectivity to the more commonly used alkyl derivitized phases, such as octadecyl (C18). While nitrile-modified phases are more commonly silica-based, surface graft modification of a polymer particle can be easily accomplished. A nitrile-modified resin 14 can thus be provided.

Experimentation #4—Acrylonitrile Surface Graft Modification:

50 g of a 70 micron, 500 $m^2$/g surface area and 1.1 ml/g pore volume PSDVB polymer sorbent made from 50% divinylbenzene and 50% styrene was added to 300 ml of tetrahydrofuran. To this solution was added 25 ml of the modifying alkene reagent acrylonitrile and 0.5 g of the free radical initiator 2,2'-azobisisobutyronitrile. This was heated to a boiling condition (about 66 C.) for 18 hours, and washed with tetrahydrofuran to remove any un-reacted monomers or polymers formed in solution. This modified surface contains nitrogen, which was measured as 2.8% by weight of the surface graft modified polymer particle or resin 14. This corresponds to a level of grafting of 4.1 micromoles of surface grafted monomer per meter squared (umol/$m^2$) on the surface of the polymer particle, which is similar in concentration to a silica-based modified resin.

In a third embodiment, surface graft modification may also be employed to chemically modify a polymer particle's surface in order to deposit alternate functional groups, such as carboxylic anhydride. The polymer particle can be further reacted with reagents with amine functionality. Amine groups are commonly used for facilitating ion-exchange chromatography.

Experimentation #5—Maleic Anhydride Surface Graft Modification Followed by an Additional Derivitization:

50 g of a 30 micron, 800 $m^2$/g surface area and 1 ml/g pore volume polymer particle made from 80% divinylbenzene and 20% ethylstyrene was added to 300 ml of 1,4-dioxane. To this solution was added 25 g of the modifying alkene reagent maleic anhydride and 0.5 g of the free radical initiator 2,2'-azobisisobutyronitrile. This was heated to a boiling condition (about 100 C.) for 3 hours, and washed with 1,4-dioxane to remove any un-reacted monomers or polymers formed in solution. This modified surface contains the reactive carboxylic anhydride chemical group found in the modifying reagent. These reactive carboxylic anhydride groups were used to further modify the surface.

The polymer particle was then placed in 300 ml of 1,4-dioxane, adding 15 ml of pentaethylenehexamine and allowing this to react at room temperature overnight. The polymer particle was then washed with 1,4-dioxane to remove any un-reacted pentaethylenehexamine and dried at 90 C. in an oven to remove the 1,4-dioxane. This produced a solid resin 14 with 4.7% nitrogen. This corresponds to a surface coverage of 4.4 u moles/$m^2$ of amine and amide chemical groups, suitable for use in ion-exchange chromatography.

As illustrated, polymer particles 10 can be altered by surface graft modification to produce a resin 14 having a variety of chromatographic application. The advantage of employing surface graft modification to chromatographically enhance an existing polymer particle 10 as opposed to forming a totally new resin by co-polymerization, is that it can be performed without greatly impacting the specific physical structure/morphology of the polymer particle 10. As mentioned above, a readily available cross-linked polymer particle 10 with desired physical specifications (e.g., pore size, surface area or pore volume) can be simply selected from "off-the-shelf" particles, or specifically made with the desired characteristics. This selected polymer particle 10 may then be surface graft modified with a desirable chemical modifier, without dramatically affecting the physical structure/morphology of the polymer particle 10. This method of achieving a chromatographically enhanced resin 14 is very efficient compared to the difficulties associated with the formation of a new resin by co-polymerization.

There is thus advantageously provided a resin having an enhanced chromatographic property for use in chromatographic applications. The resin 14 has a polymer particle 10 defining a surface having at least one unreacted alkene group formed thereon. The resin also has a monomer having at least one unreacted alkene group thereon attached to the at least one unreacted alkene group on the surface of the polymer particle through surface graft modification performed in a solution that dissolves the monomer but does not chemically react with the monomer or the particle. One or both of the polymer particle and the monomer are selected to enhance a desired chromatographic property of resulting resin. Preferably, but optionally, there is only one alkene group in the monomer. Preferably, but optionally, the polymer particle is (poly)styrene-divinylbenzene, and the monomer is N-vinylpyrrolidone.

Further, the resin 14 is placed in a housing containing the chromatographically enhanced polymer particle therein. The housing may take various forms. Cylindrical tubes of various diameters and lengths are commonly used. The housings are configured to attach to a predetermined chromatographic apparatus during use of the polymer. Threaded fittings are commonly used, with the resin 14 being contained in tubes, cartridges, guard cartridges, thin film membrane housings, SPE housings, or other housings suitable to the particular chromatographic application. Tubular housings, including housings with connectors of the type found in U.S. patent application No. 6,162,362, to Qi Feng, Ma, are believed suitable, and the entire contents of that patent is incorporated herein by reference.

The use of the resin 14 provides new and unexpected advantages in chromatographic applications and method of using the resin, especially those that include separating at least one target solute from a solution. The method comprises determining at least one target solute to be separated from the solution. Then a polymer particle is obtained where the particle has an unreacted alkene group on the surface thereof, the polymer particle and is selected from the group comprising polyacrolates, polymethacrolates, and polystyrenes. Then a monomeric alkene group is selected that has the ability to attract the target solute and temporarily bind that target solute to the monomeric alkene group a time sufficient for a chromatographic application. The temporary binding results in the retention that separate the chemicals so they can be chromatographically identified. Finally, a solution based, free radical initiated, surface graft modification is used to attach the selected monomeric alkene group to the unreacted alkene group on the polymer particle. The target solute is then contacted with the resin, which absorbs the target solute during a chromatographic application.

The chromatographic application can use resins comprising a plurality of beads having a diameter of about 1 µm to about 500 µm, or it can use a membrane having a thickness of about 0.1 mm to about 50 mm, or it can use as a monolith (preferably a cylindrical monolith). Advantageously, but optionally, the polymer particle is selected to have at least two desired physical characteristic selected from the group comprising pore size, pore volume, surface area, particle shape and particle size. Other physical properties of the particle 10 can be used as selection criteria, depending on the intended use and desired characteristics of the resin 14.

There is thus advantageously provided a method for providing or making a chromatographic media by which a person can select a polymer particle 10 having physical characteristics that are suitable for or offer advantages for particular chromatographic application. For example, using porous or non-porous beads 10, or particular sizes or particular geometric shapes of the particles 10. A much wider variety of polymer particles 10 are available than are available with silica particles. Those selected particles 10 are then modified to provide various chromatographic performance characteristics using surface-graft modification. The resulting resin 14 can thus be tailored to specific needs, and can provide chromatographic and performance characteristics superior to silica based chromatographic media. Further, while the above resins 14 is described a being made with a free radical initiator, it is believed possible to omit the initiator.

Moreover, the resin 14 resulting from the surface graft modification described herein can be modified for further selectivity. For example, the resin 14 may be sulfonated in order to further alter the retention characteristics for particular target solutes.

Additional modifications and improvements may also be apparent to those of ordinary skill in the art. Thus, the particular combination of parts described and illustrated herein is intended to represent only certain preferred embodiments, and is not intended to serve as limitations of alternative devices within the spirit and scope of the invention.

What is claimed is:

1. A method for making a polymeric chromatographic support comprising the steps of:
  a. selecting a plurality of polymer particles having a specified physical structure and morphology formed from at least one first monomer possessing from 10% to 100% cross-linking wherein said cross-linking is formed exclusively from monomers having at least 2 alkene groups and wherein a portion of said alkene groups remain unreacted, said polymer particles further defining a surface area ranging from about 1 to 1200 square meters per gram of the polymer particles, the particles having from 0.01 µmol/m$^2$ to 8 µmol/m$^2$ un-reacted alkene groups on a surface thereof;
  b. selecting a chemical modifier comprising a second monomer having free alkene groups which provide chromatographic performance, said second monomer being dissimilar from said at least one first monomer;
  c. selecting a solvent in which the chemical modifier is soluble and which is not reactive with the selected polymer particle;
  d. selecting a free radical initiator;
  e. placing the polymer particles, free radical initiator and modifier in the solvent and elevating the temperature as needed to cause a solution-based surface graft modification reaction that attaches the modifier to said unreacted alkene groups of the polymer particle without affecting said physical structure and morphology of said polymer particles.

2. The method of claim 1, further comprising selecting the polymer particles from the group comprising polyacrylates, polymethacrylates, and polystyrenes.

3. The method of claim 1, wherein the free radical initiator is AIBN.

4. The method of claim 2, wherein the free radical initiator is AIBN.

5. The method of claim 1, wherein the polymer particles comprise a plurality of particles having a diameter of about 1 to about 500 μm.

6. The method of claim 2, wherein the polymer particles comprise a plurality of particles having a diameter of about 1 to about 500 μm.

7. The method of claim 3, wherein the polymer particles comprise a plurality of particles having a diameter of about 1 to about 500 μm.

8. A method for making a polymeric chromatographic support comprising the steps of:
   a. selecting a polymer membrane having a specified physical structure and morphology formed from at least one first monomer possessing from 10% to 100% cross-linking wherein said cross-linking is formed exclusively from monomers having at least 2 alkene groups and wherein a portion of said alkene groups remain unreacted, said polymer particles further defining a surface area ranging from about 1 to 1200 square meters per gram of the membrane, the membrane having a number of from 0.01 μmol/m$^2$ to 8 μmol/m$^2$ un-reacted alkene groups on a surface thereof;
   b. selecting a chemical modifier comprising a second monomer having free alkene groups which provide chromatographic performance, said second monomer being dissimilar from said at least one first monomer;
   c. selecting a solvent in which the chemical modifier is soluble and which is not reactive with the selected polymer membrane;
   d. selecting a free radical initiator;
   e. placing the polymer particles, free radical initiator and modifier in the solvent and elevating the temperature as needed to cause a solution-based surface graft modification reaction that attaches the modifier to the unreacted alkene groups of the polymer membrane without affecting said physical structure and morphology of said polymer particles.

9. The method of claim 8, wherein the membrane has a thickness of about 0.25 mm to about 2 mm, the polymer membrane further being selected from the group comprising polyacrylates, polymethacrylates, and polystyrenes.

10. The method of claim 8, wherein the free radical initiator is AIBN.

11. A method for making a polymeric chromatographic support comprising the steps of:
   a. selecting a cylindrical polymer monolith having a specified physical structure and morphology formed from at least one first monomer possessing from 10% to 100% cross-linking wherein said cross-linking is formed exclusively from monomers having at least 2 alkene groups and wherein a portion of said alkene groups remain unreacted, said polymer particles further defining a surface area ranging from about 1 to 1200 square meters per gram of the cylindrical polymer monolith, the monolith having from 0.01 μmol/m$^2$ to 8 μmol/m$^2$ un-reacted alkene groups on a surface thereof;
   b. selecting a chemical modifier comprising a second monomer having free alkene groups which provide chromatographic performance said second monomer being dissimilar from said at least one first monomer;
   c. selecting a substantially pure solvent in which the chemical modifier is soluble and which is not reactive with the selected cylindrical polymer monolith;
   d. selecting a free radical initiator;
   e. placing the polymer particles, free radical initiator and modifier in the solvent and elevating the temperature as needed to cause a solution-based surface graft modification reaction that attaches the modifier to the unreacted alkene groups of the cylindrical polymer monolith without affecting said physical structure and morphology of said polymer particles.

12. The method of claim 11, wherein the polymer is selected from the group comprising polyacrylates, polymethacrylates, and polystyrenes.

13. The method of claim 11, wherein the free radical initiator is AIBN.

14. A resin comprising:
   a. a polymer particle having a specified physical structure and morphology formed from at least one first monomer possessing from 10% to 100% cross-linking wherein said cross-linking is formed exclusively from monomers having at least 2 alkene groups and wherein a portion of said alkene groups remain unreacted, said polymer particles further and defining a surface having from 0.01 μmol/m$^2$ to 8 μmol/m$^2$ unreacted alkene groups formed thereon; and
   b. a second monomer having at least one unreacted alkene group thereon, said second monomer being dissimilar from said at least one first monomer, attached to a respective one of the unreacted alkene group on the surface of the polymer particle through surface graft modification performed in a solution that dissolves the monomer but does not chemically react with the monomer or the particle in order to form the resin, the second monomer being selected to enhance the chromatographic property of the polymer particle when attached to the unreacted alkene groups of the particle to form the resin without affecting said physical structure and morphology of said polymer particles.

15. The resin of claim 14, wherein there is only one alkene group in the second monomer.

16. The resin of claim 14, wherein the polymer particle is (poly)styrene-divinylbenzene.

17. The resin of claim 15, wherein the polymer particle is (poly)styrene-divinylbenzene.

18. The resin of claim 17, wherein the second monomer is N-vinylpyrrolidone.

19. The resin of claim 17, wherein the polymer and resin comprise a plurality of beads having a diameter of about 1 μm to about 500 μm and defining a surface area ranging from about 1 to 1200 square meters per grain of the beads.

20. The resin of claim 17, wherein the polymer and resin comprise a membrane having a thickness of about 0.1 mm to about 50 mm.

21. The resin of claim 17, wherein the polymer and resin comprise a monolith having a cylindrical shape.

22. The resin of claim 17, wherein the particle is selected from the group comprising polyacrylates, polymethacrylates, polyethylbenzenes and polystyrenes.

23. The method of claim 1, wherein said polymer particles possess from 45–100% cross-linking.

24. The method of claim 23 wherein said polymer particles possess from 70–100% cross-linking.

25. The method of claim 1, wherein the polymer particles have a diameter from 1–300μm.

26. The method of claim 1, wherein said polymer particles are porous and have a median pore size of about 10 angstroms to about 5,000 angstroms.

27. The method of claim 26, wherein said polymer particles have a pore size ranging from about 50 angstroms to about 4,000 angstroms.

28. The method of claim 1, wherein said solvent is non-aqueous.

29. The method of claim 28, wherein said solvent is selected from the group comprising methanol, 1,4-dioxane, and tetrahydrofuran.

30. The method of claim 8, wherein said solvent is non-aqueous.

31. The method of claim 30, wherein said solvent is selected from the group comprising methanol, 1,4-dioxane, and tetrahydrofuran.

32. The method of claim 11 wherein said solvent is non-aqueous.

33. The method of claim 32 wherein said solvent is selected from the group comprising methanol, 1,4-dioxane, and tetrahydrofuran.

* * * * *